US011322802B2

(12) United States Patent
Yanagida et al.

(10) Patent No.: US 11,322,802 B2
(45) Date of Patent: May 3, 2022

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Shimoda, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 612 days.

(21) Appl. No.: 16/400,560

(22) Filed: May 1, 2019

(65) Prior Publication Data

US 2019/0355955 A1 Nov. 21, 2019

(30) Foreign Application Priority Data

May 21, 2018 (JP) .............................. JP2018-097204

(51) Int. Cl.
*H01R 24/00* (2011.01)
*H01M 50/502* (2021.01)
(Continued)

(52) U.S. Cl.
CPC ....... *H01M 50/502* (2021.01); *B60R 16/0215* (2013.01); *H01M 10/4207* (2013.01);
(Continued)

(58) Field of Classification Search
CPC .............. H01M 50/502; H01M 50/20; H01M 10/4207; H01M 10/482; H01M 2220/20; H01R 16/0215; H01R 11/288; Y02E 60/12

See application file for complete search history.

(56) References Cited

U.S. PATENT DOCUMENTS 3,960,602 A * 6/1976 Schenk, Jr. ......... H01M 50/528
429/158
7,635,537 B2 * 12/2009 Vutetakis .............. H01M 50/54
429/149

(Continued)

FOREIGN PATENT DOCUMENTS

JP 2011-181402 9/2011

*Primary Examiner* — Thanh Tam T Le
(74) *Attorney, Agent, or Firm* — Greenblum & Bernstein, P.L.C.

(57) ABSTRACT

A wiring module that can account for tolerance in an alignment direction of a plurality of power storage devices includes: a first unit row including a plurality of first units linked by a first warping linking portion and a first slide linking portion that enable adjustment of an interval between the plurality of first units, the first warping linking portion having a warping portion and the linking portion having an inner wall and an outer wall; a second unit row including a plurality of second units linked by a second linking portion having an inner wall and an outer wall and enables adjustment of an interval between the plurality of second units, the second unit row being disposed side-by-side with the first unit row; and a row linking portion that has a variable row-interval portion that enables adjustment of an interval between the first and the second unit rows.

2 Claims, 5 Drawing Sheets

(51) Int. Cl.
  *H01M 10/42*     (2006.01)
  *H01R 11/28*     (2006.01)
  *B60R 16/02*     (2006.01)
  *H01M 10/48*     (2006.01)
  *H01M 50/20*     (2021.01)

(52) U.S. Cl.
  CPC ......... *H01M 10/482* (2013.01); *H01M 50/20* (2021.01); *H01R 11/288* (2013.01); *H01M 2220/20* (2013.01)

(56) References Cited

U.S. PATENT DOCUMENTS

| | | | |
|---|---|---|---|
| 8,399,128 B2 * | 3/2013 | Kim | H01M 50/502 |
| | | | 439/627 |
| 8,426,056 B2 * | 4/2013 | Ikeda | H01M 50/20 |
| | | | 429/158 |
| 9,397,327 B2 * | 7/2016 | Takase | H01M 50/502 |
| 9,425,595 B2 * | 8/2016 | Nakayama | B60L 50/64 |
| 9,608,250 B2 * | 3/2017 | Ogasawara | H01M 50/502 |
| 9,780,351 B2 * | 10/2017 | Shimoda | B60L 58/21 |
| 10,003,107 B2 * | 6/2018 | Nishihara | H01M 50/502 |
| 10,020,484 B2 * | 7/2018 | Nakayama | H01M 50/502 |
| 10,115,953 B2 * | 10/2018 | Oshiba | H01M 50/502 |
| 10,707,589 B2 * | 7/2020 | Yamanaka | H01R 4/48 |
| 10,714,731 B2 * | 7/2020 | Matsumura | H01R 25/162 |
| 2012/0322320 A1 | 12/2012 | Takase et al. | |

\* cited by examiner

WIRING MODULE

TECHNICAL FIELD

The technology disclosed in the present specification relates to a wiring module.

BACKGROUND ART

Conventionally, the technology disclosed in JP 2011-181402A is known as a wiring module to be provided on a power storage device group in which a plurality of power storage devices are arranged side-by-side in an alignment direction. This wiring module includes a first unit row configured of individual units that each house a bus bar with adjacent individual units linked to each other, a second unit row that is configured of individual units that each house a bus bar with adjacent individual units linked to each other, and is disposed side-by-side with the first unit row, and a positioning member that is connected to both the first unit row and the second unit row and relatively positions the first unit row and second unit row.

JP 2011-181402A is an example of related art.

SUMMARY OF THE INVENTION

When the power storage devices are arranged side-by-side in the alignment direction, the manufacturing tolerances and the attachment tolerances of electrode terminals of the power storage devices accumulate in the alignment direction. In such a case, it is conceivable that the individual units are linked to each other by using a structure in which the interval between individual units can be adjusted. Accordingly, it was expected that the accumulated tolerance in the alignment direction can be accounted for.

However, if the above-described configuration is employed, there is an issue in that the first unit row and the second unit row are fixed by the positioning member, and thus the tolerance in the interval between the first unit row and the second unit row cannot be accounted for.

The technology disclosed in the present specification was achieved in light of the above-described circumstances, and it is an object of the present invention to provide a wiring module that can account for both tolerance in the alignment direction in which the power storage devices are arranged side-by-side as well as a tolerance in the interval between the first unit row and the second unit row.

The technology disclosed in the present specification is a wiring module that is to be provided on a power storage device group in which a plurality of power storage devices that each have an electrode terminal are arranged side-by-side in an alignment direction, the wiring module including: a first unit row including a plurality of first units that each house at least one first bus bar that is to be connected to a corresponding electrode terminal, the plurality of first units being linked by a first linking portion that has a first variable interval portion that enables adjustment of an interval between the plurality of first units; a second unit row including a plurality of second units that each house at least one second bus bar that is to be connected to a corresponding electrode terminal, the plurality of second units being linked by a second linking portion that has a second variable interval portion and enables adjustment of an interval between the plurality of second units, and the second unit row being disposed side-by-side with the first unit row; and a row linking portion that is connected to both the first unit row and the second unit row and links the first unit row and the second unit row, and includes a variable row-interval portion that enables adjustment of an interval between the first unit row and the second unit row.

According to the above-described configuration, the first variable interval portion and the second variable interval portion can be used to account for tolerance in the interval between the electrode terminals of the power storage devices arranged side-by-side in the alignment direction. Also, the variable row-interval portion can be used to account for tolerance in the interval between the first unit row and the second unit row.

The following mode is favorable as an embodiment of the technology disclosed in the present specification.

The wiring module includes a first routing portion provided in the first unit row that is provided with a first extension portion that extends toward the second unit row, and a second routing portion provided in the second unit row that is provided with a second extension portion that extends toward the first unit row and is arranged partially overlapped with the first extension portion, and a wire is disposed in the first routing portion, the first extension portion, the second routing portion, and the second extension portion.

According to the above-described configuration, wires can be routed spanning the first routing portion and the second routing portion via the first extension portion and the second extension portion. Accordingly, freedom in the routing of the wires is increased, and thus the wires can be easily routed in the wiring module.

With the technology disclosed in the present specification, tolerance in the alignment direction in which the power storage devices are are arranged side-by-side and tolerance in the interval between the first unit row and the second unit row can both be accounted for.

EMBODIMENTS OF THE INVENTION

Embodiment 1

Embodiment 1 of the technology disclosed in the present specification will be described with reference to FIGS. 1 to 5. A wiring module 10 according to the present embodiment constitutes a power storage module 13 by being attached to a power storage device group 12, which is a plurality of power storage devices (twenty in the present embodiment) 11 that are arranged side-by-side. The power storage module 13 is installed in a vehicle (not shown) such as an electric automobile or a hybrid automobile, and is used as a motive power source for driving the vehicle. In the description below, a description is given in which the Z direction is the upward direction, the Y direction is the forward direction, and the X direction is the leftward direction. Also, there may be cases where, for a plurality of the same members, a reference number is assigned to some of them and not assigned to the other members.

Power Storage Device 11

Each of the power storage devices 11 according to the present embodiment is a secondary battery. Power storage elements (not shown) are housed in the power storage devices 11. The power storage devices 11 have a substantially rectangular parallelepiped shape. A pair of electrode terminals 14 are provided on the upper surface of each power storage device 11 at positions close to the two end portions in the front-rear direction, respectively. One electrode terminal 14 is a positive terminal and the other is a negative terminal. A stud bolt with threading on the outer circumferential surface is provided protruding upward from the upper surface of each electrode terminal 14.

The power storage device group 12 is formed by arranging a plurality of pairs of power storage devices 11, in which two power storage devices 11 are arranged so that electrode terminals 14 with the same polarity are adjacent to each other, in the left-right direction (an example of an alignment direction). The pairs of power storage devices 11 are aligned such that the polarities of electrode terminals 14 are different in adjacent pairs of power storage devices 11. For example, in one pair of power storage devices 11, if the positive electrodes are arranged on the front side and the negative electrodes are arranged on the rear side, in another pair of power storage devices 11 adjacent to the said pair of power storage devices 11, the negative electrodes are arranged on the front side and the positive electrodes are arranged on the rear side.

A pair of end plates 47 are arranged on the left and right end portions of the power storage device group 12. The pair of end plates 47 are held between a pair of sandwiching plates 48 that are fixed to the front and rear side surfaces of the power storage device group 12 using bolts 49.

Wiring Module 10

Figure 1:
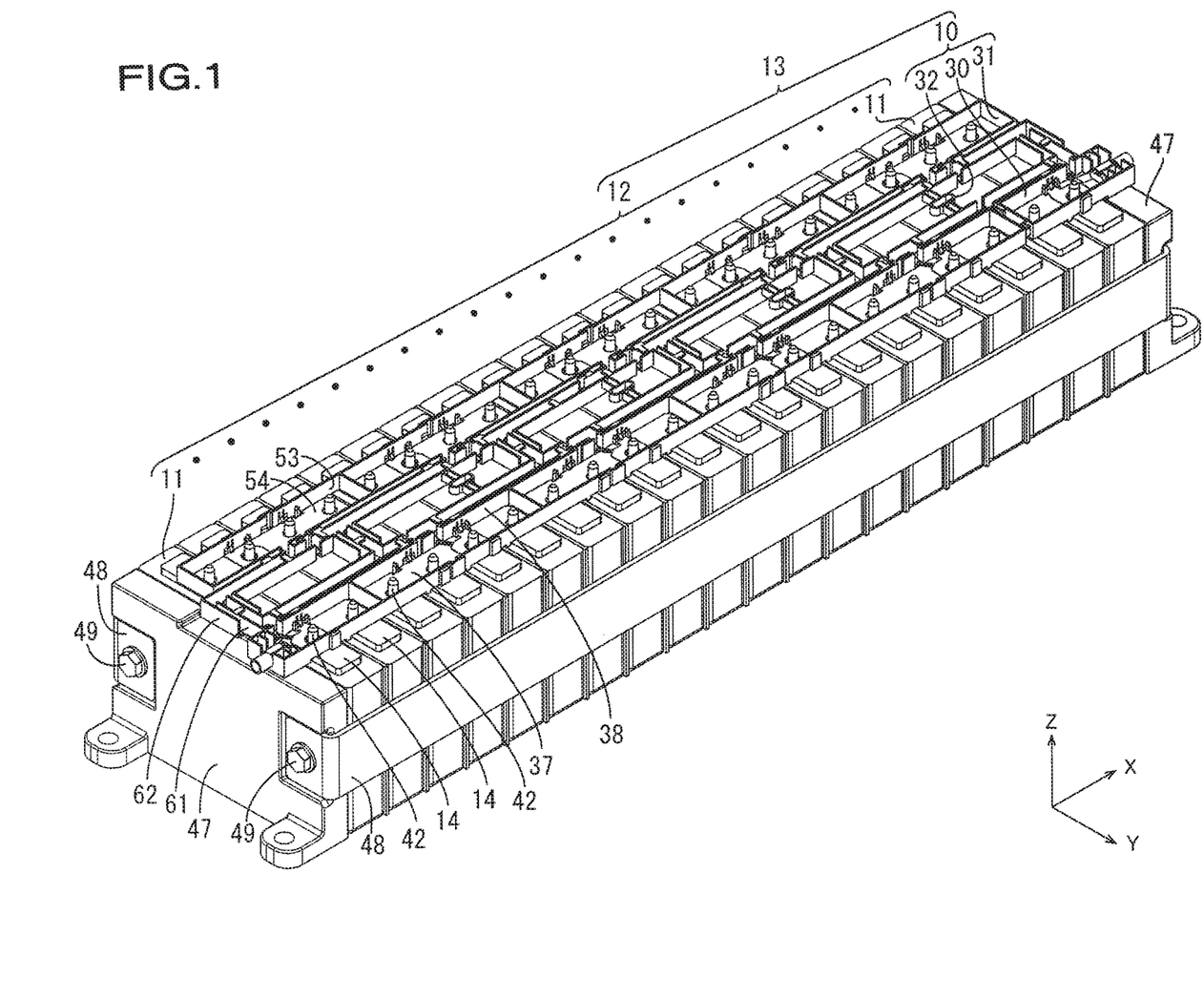
FIG. 1 shows a perspective view of a power storage module according to Embodiment 1.

As shown in FIG. 1, the wiring module 10 is attached to the upper surface of the power storage device group 12. Overall, the wiring module 10 is elongated in the left-right direction.

As shown in FIG. 1, the wiring module 10 includes a first unit row 30 disposed on the front side, a second unit row 31 disposed on the rear side, and row linking portions 32 that link the first unit row 30 and the second unit row 31 to each other.

First Unit Row 30

The first unit row 30 is configured by linking together a plurality of first units 33 arranged side-by-side in the left-right direction using first warping linking portions 35 (example of first linking portion) and first slide linking portions 36 (example of first linking portion). The first units 33 are made of a synthetic resin with insulating properties. The first units 33 each have a first bus bar housing portion 38 that houses a first bus bar 37. The first bus bar housing portions 38 have a substantially rectangular shape when seen from above. The first bus bar housing portions 38 have a box shape and are open upward, and a first bus bar 37 is housed in each first bus bar housing portion 38. A voltage detection terminal 22 is housed in each first bus bar housing portion 38 in a state of being overlapped with the first bus bar 37. The first bus bar 37 and the voltage detection terminal 22 are held in a state where they are kept from coming out upward from the first unit 33 by a locking claw 50 provided on the first bus bar housing portion 38.

Figure 2:
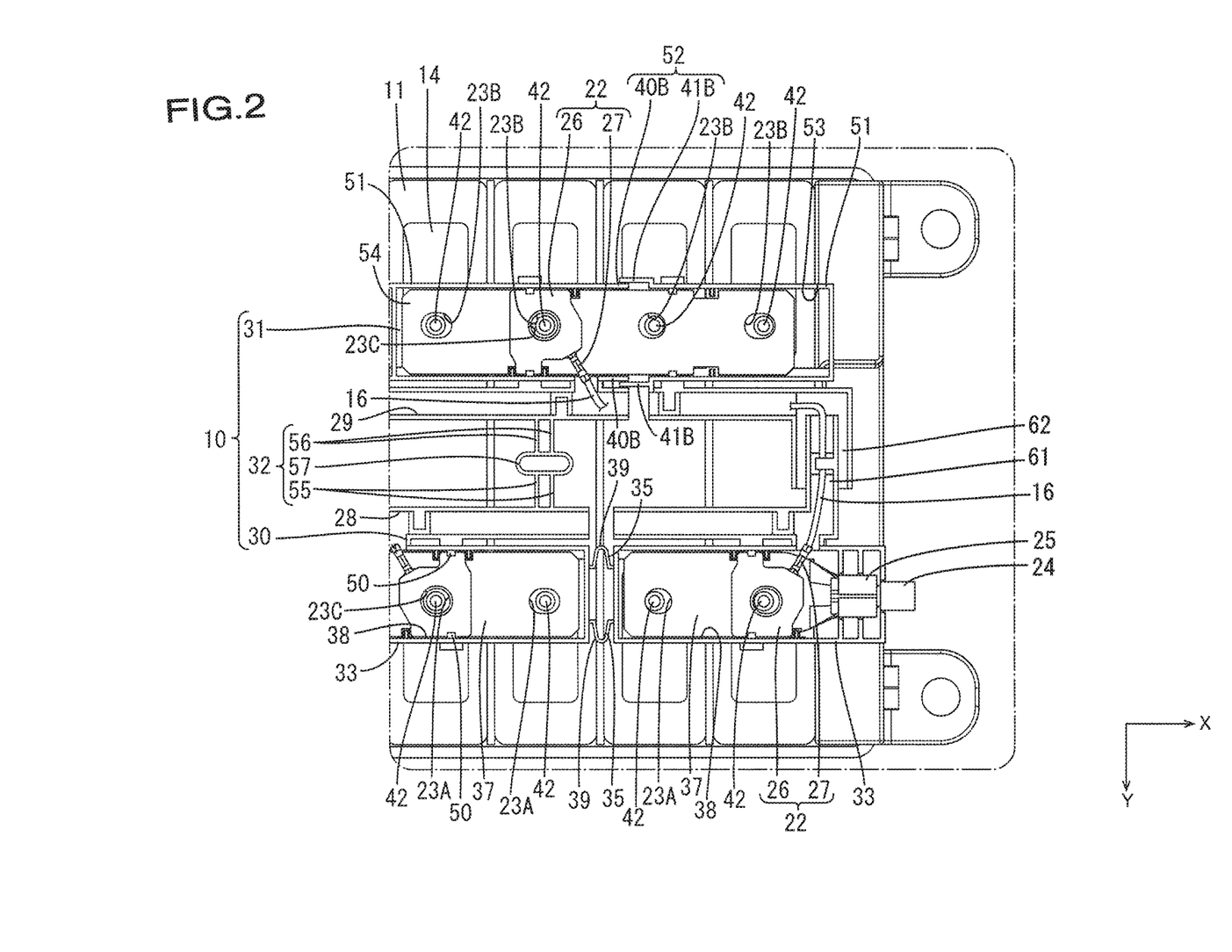
FIG. 2 shows a partially enlarged plan view of a wiring module in a case where tolerance between power storage devices is at the maximum in a left-right direction.

As shown in FIG. 2, the first unit 33 located at the left end portion of the first unit row 30 and the first unit 33 located second from the left are linked by first warping linking portions 35. The first warping linking portions 35 have a plate shape, and are formed integrated with first units 33 adjacent to each other in the left-right direction. Adjacent first units 33 are linked by a plurality (two in the present embodiment) of first warping linking portions 35. The first warping linking portions 35 form a U shape when seen from above and have warping portions 39 (example of first variable interval unit) that can elastically deform. These warping portions 39 enable adjustment of the interval between adjacent first units 33 through warping deformation.

Figure 4:
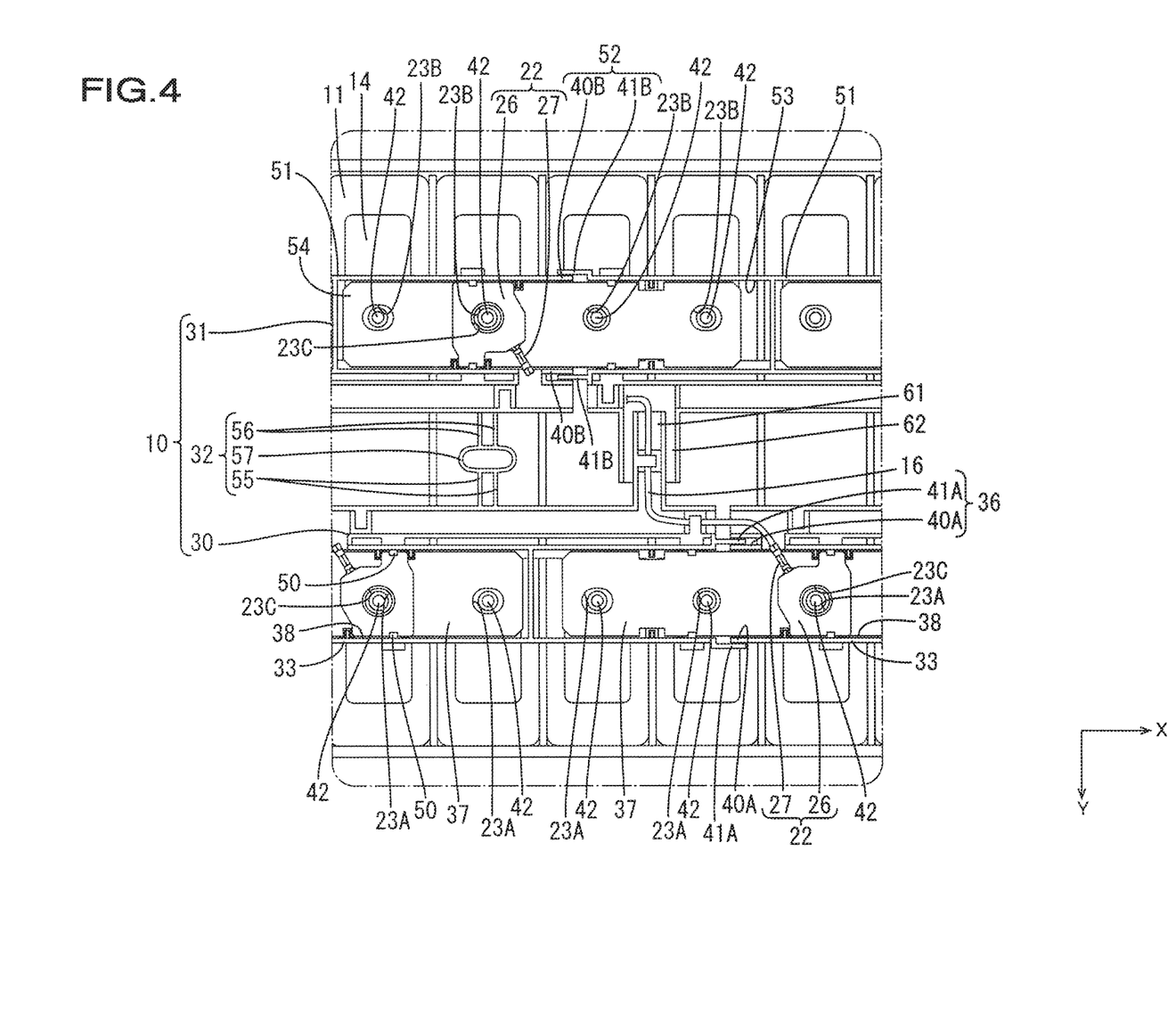
FIG. 4 shows a partially enlarged plan view of a case where tolerance between power storage devices is at the maximum in a front-rear direction.

As shown in FIG. 4, first units 30 different to the first unit 33 located at the left end portion of the first unit row 30 and the second first unit 33 from the left are linked to each other by a first slide linking portion 36. The first slide linking portion 36 includes an inner wall 40A (example of first variable interval portion) that extends from one of two first units 33 adjacent in the left-right direction towards the other, and an outer wall 41A (an example of a first variable interval portion) that extends from the other of the two first units 33 adjacent in the left-right direction towards the one, is located on the outer side of the inner wall 40A, and slides along the outer surface of the inner wall 40A. The inner wall 40A and the outer wall 41A are formed to be able to slide and move in the left-right direction. As a result of the inner wall 40A and the outer wall 41A of the first slide linking portion 36 sliding in the left-right direction, the interval between adjacent first units 33 can be adjusted.

Second Unit Row 31

As shown in FIGS. 2 to 5, the second unit row 31 is configured by linking together a plurality of second units 51 arranged side-by-side in the left-right direction using second linking portions 52. The second units 51 are made of a synthetic resin with insulating properties, and each include a second bus bar housing portion 53. The second bus bar housing portions 53 have a substantially rectangular shape when seen from above. The second bus bar housing portions 53 have a box shape and are open upward, and a second bus bar 54 is housed in each second bus bar housing portion 53. A voltage detection terminal 22 is housed in each second bus bar housing portion 53 in a state of overlapping the second bus bar 54. The second bus bar 54 and the voltage detection terminal 22 are held in a state where they are kept from coming out upward from the the second unit 51 by a locking claw 50 provided on the second bus bar housing portion 53.

The second link portions 52 include an inner wall 40B (example of second variable interval portion) that extends from one of two second units 51 adjacent in the left-right direction towards the other, and an outer wall 41B (example of second variable interval portion) that extends from the other of the two second units 51 adjacent in the left-right direction towards the one, is located on the outer side of the inner wall 40B, and slides along the outer surface of the inner wall 40B. The inner wall 40B and the outer wall 41B are formed to be able to slide and move in the left-right direction. As a result of the inner wall 40B and the outer wall 41B of the second linking portion 52 sliding in the left-right direction, the interval between adjacent second units 51 can be adjusted.

Row Linking Portion 32

As shown in FIGS. 2 to 5, the row linking portions 32 are formed integrated with a first unit 33 and a second unit 51. The linking members 32 include two first plate portions 55 that protrude from the first unit 33 toward the second unit 51, two plate units 56 that protrude from the second unit 51 toward the first unit 33, and a variable row-interval portion 57 that has an oval shape elongated in the left-right direction and links the first plates portions 55 to the second plate portions 56. The variable row-interval portion 57 is formed to be elastically deformable in the front-rear direction. Specifically, when the interval between the first unit row 30 and the second unit row 31 narrows, the variable row-interval portion 57 warps and deforms into a shape that is compressed in the front-rear direction.

First Bus Bar 37

As shown in FIG. 1, the first bus bars 37 are formed by pressing a metal plate into a predetermined shape. As the material of the metal plate, copper, a copper alloy, iron, an iron alloy, aluminum, an aluminum alloy, or the like can be appropriately selected as needed. The first bus bars 37 have an elongated shape in the left-right direction when seen from above. Each of the first bus bars 37 is provided with a plurality of through-holes 23A that extend through the first bus bars 37 and through which stud bolts 42 are passed. The through-holes 23A have an oval shape that is elongated in the left-right direction.

The first bus bar 37 housed in the first unit 33 at the left end portion and the first bus bar 37 housed in the first unit 33 at the right end portion are provided with a barrel portion 25 to which an electrical wire for connecting an external circuit and the power storage device group 12 is connected. The barrel portion 25 is configured to electrically connect the electrical wire and the power storage device group 12 by being crimped to the outer circumferential surface of an electrical wire 24. The first bus bar 37 housed in the first unit 33 at the left end portion and the first bus bar 37 housed in the first unit 33 at the right end portion are each provided with two through-holes 23A.

Each first bus bar 37 housed in a first unit 33 different to the first units 33 disposed at the left end portion and the right end portion is provided with four through-holes 23A aligned in the left-right direction.

In a state where the stud bolts 42 are passed through the through-holes 23A, the electrode terminals 14 and the first bus bars 37 are electrically connected to each other by screwing an un-shown nut to the stud bolts 42.

Second Bus Bar 54

The second bus bars 54 are provided with a plurality (four in the present embodiment) of through-holes 23B through which stud bolts 42 are to be passed, extending through the second bus bars 54. The through-holes 23B have an oval shape elongated in the left-right direction.

In a state where the stud bolts 42 are passed through the through-holes 23B, the electrode terminals 14 and the second bus bars 54 are electrically connected to each other by screwing an un-shown nut to the stud bolts 42. Apart from the configuration described above, the second bus bars 54 are almost the same as the first bus bars 37, and thus a redundant description is omitted.

Voltage Detection Terminal 22

As shown in FIG. 2, the voltage detection terminals 22 are formed by pressing a metal plate into a predetermined shape. As the material of the metal plate, copper, a copper alloy, iron, an iron alloy, aluminum, an aluminum alloy, or the like can be appropriately selected as needed. The voltage detection terminals 22 each include an electrode connection portion 26 that has a plate shape, and a barrel portion 27 extending from the electrode connection portion 26.

The electrode connection portion 26 is provided with a through-hole 23C through which a stud bolt 42 is to be passed. The electrode connection portion 26 is sandwiched between a nut and the first bus bar 37 or the second bus bar 54, and as a result, the voltage detection terminal 22 and the electrode terminal 14 are electrically connected to each other.

The barrel portion 27 is crimped to one end portion of a voltage detection wire 16 (an example of a wire). The other end portion of the voltage detection wire 16 is connected to an external connection device (not shown) such as an ECU (Electronic Control Unit).

Note that the ECU is equipped with a micro computer, elements, and the like, and employs a known configuration equipped with the functions of detecting the voltage, current, temperature, and the like of the power storage devices 11, and controlling charging, discharging, and the like of each of the power storage devices 11.

First Routing Portion 28

As shown in FIG. 2, a first routing portion 28 extending in the left-right direction is formed at the rear portion of the first unit row 30 disposed at a position near the front end portion of the wiring module 10. The first routing portion 28 has a groove shape that is open upwards, and voltage detection wires 16 are routed therein.

First Extension Portion 61

A plurality of first extension portions 61 extending rearward toward the second unit row 31 are provided at the rear edge portion of the first routing portion 28. The first extension portions 61 have a groove shape that is open upwards, and voltage detection wires 16 are routed therein. The rear end portion of each of the first extension portions 61 is distanced from the second unit row 31.

Second Routing Portion 29

A second routing portion 29 extending in the left-right direction is formed at the front portion of the second unit row 31 provided at a position near the rear end portion of the wiring module 10. The second routing portion 29 has a groove shape and is open upwards, and voltage detection wires 16 are routed therein.

Second Extension Portion 62

A plurality of second extension portions 62 extending forward toward the first unit row 30 are provided at the front edge portion of the second routing portion 29. The second extension portions 62 have a groove shape that is open upwards, and voltage detection wires 16 are routed therein. The front end portion of each of the second extension portions 62 is distanced from the first unit row 30.

The second extension portions 62 and the first extension portions 61 are arranged overlapping each other in the up-down direction. In the present embodiment, the first extension portions 61 are arranged in a state of overlapping the second extensions portions 62 from above. The width of the second extension portions 62 in the left-right direction is set larger than the width of the first extension portions 61 in the left-right direction. Accordingly, there is a gap between the side walls of the second extension portions 62 and the side walls of the first extension portions 61.

Operations and Effects of Present Embodiment

Next, the operations and effects of the present embodiment will be described. In the present embodiment, a wiring module 10, which is to be provided on a power storage device group 12 in which a plurality of power storage devices 11 that each have an electrode terminal 14 are arranged side-by-side in an alignment direction, includes: a first unit row 30 including a plurality of first units 33 that each house at least one first bus bar 37 that is to be connected to a corresponding electrode terminal 14, the plurality of first units 33 being linked by a first warping linking portion 35 and a first slide linking portion 36 that enable adjustment of an interval between the plurality of first units 33, the first warping linking portion 35 having a warping portion 39 and the linking portion 36 having an inner wall 40A and an outer wall 41A; a second unit row 31 including a plurality of second units 51 that each house at least one second bus bar 54 that is to be connected to a corresponding electrode terminal 14, the plurality of second units 51 being linked by a second linking portion 52 that has an inner wall 40B and an outer wall 41B that enable adjustment of an interval between the plurality of second units 51, and the second unit row 31 being disposed side-by-side with the first unit row 30; and a row linking portion 32 that is connected to both the first unit row 30 and the second unit row 31 and links the first unit row 30 and the second unit row 31, and includes a variable row-interval portion 57 that enables adjustment of an interval between the first unit row 30 and the second unit row 31.

According to the above-described configuration, the tolerance between electrode terminals 14 of the power storage devices 11 arranged side-by-side in the alignment direction can be accounted for by the warping portions 39, the inner walls 40A, the outer walls 41A, the inner walls 40B, and the outer walls 41B. Also, the tolerance of the interval between the first unit row 30 and the second unit row 31 can be accounted for by the variable row-interval portions 57.

Maximum in the Left-Right Direction

FIG. 2 shows the wiring module 10 in a state where the tolerances between the power storage devices 11 are at the maximum in the left-right direction. In the elongated hole-shaped through-holes 23A of the first bus bars 37, the stud bolts 42 provided on the electrode terminals 14 are positioned shifted from the center of the through-holes 23A. Also, the first warping linking portions 35 positioned between adjacent first units 33 are in a state of extending in the left-right direction. The region where the inner wall 40A and the outer wall 41A overlap each other in the front-rear direction is at the minimum in the first slide linking portions 36 located between adjacent first units 33. Also, the region where the inner wall 40B and the outer wall 41B overlap each other in the front-rear direction is at the minimum in the second linking portions 52 located between adjacent second units 51. In this way, in a state where the tolerances between the power storage devices 11 are at the maximum in the left-right direction, it is possible to account for the total sum of the tolerances.

Figure 3:
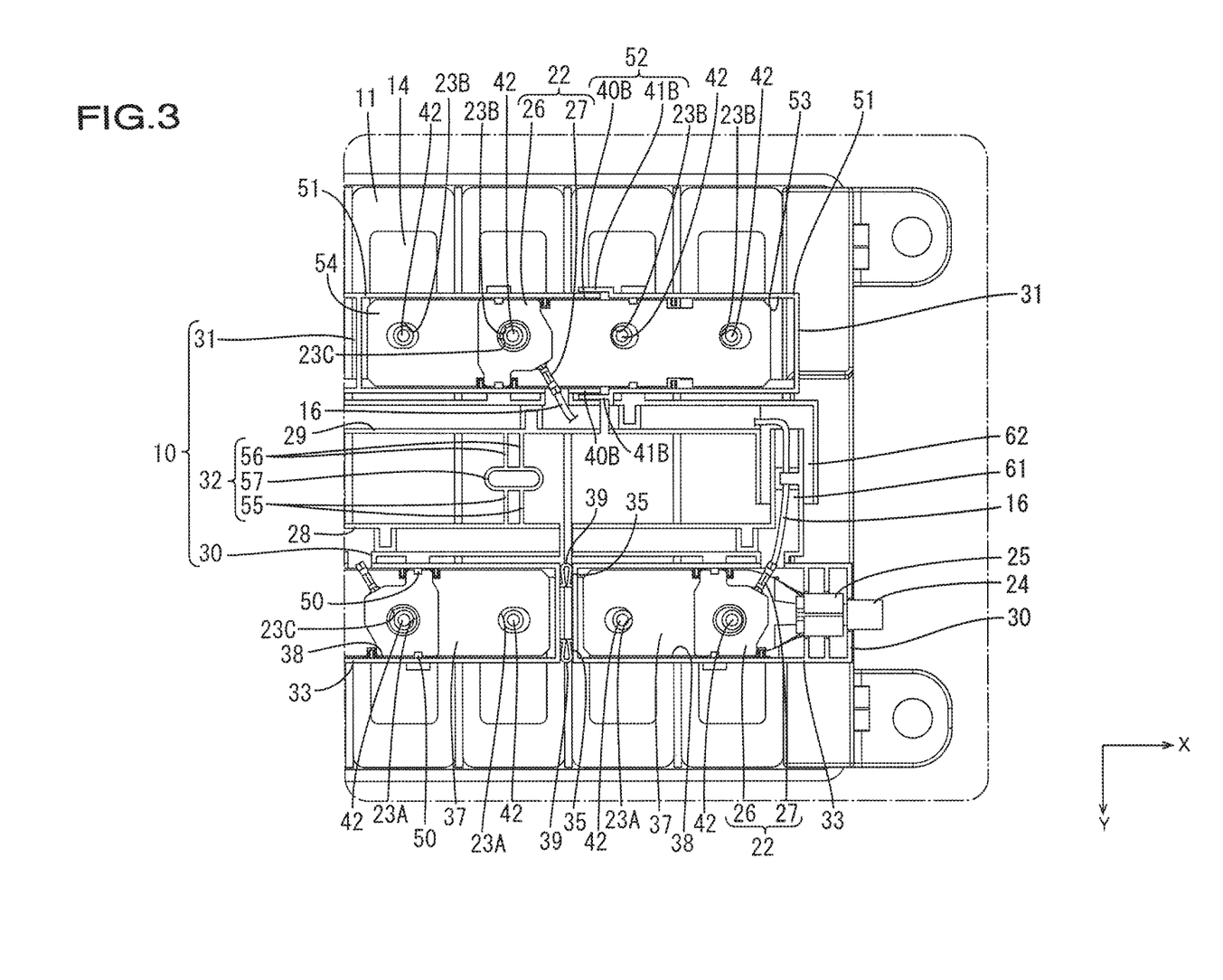
FIG. 3 shows a partially enlarged plan view of a wiring module in a case where tolerance between power storage devices is at the minimum in the left-right direction.

On the other hand, FIG. 3 shows the wiring module 10 in a state where the tolerances between the power storage devices 11 are at the minimum in the left-right direction. In the elongated hole-shaped through-holes 23A of the first bus bars 37, the stud bolts 42 provided on the electrode terminals 14 are positioned shifted from the center of the through-holes 23A. The first warping linking portions 35 positioned between adjacent first units 33 are in a state of being compressed in the left-right direction. Also, the region where the inner wall 40A and the outer wall 41A overlap each other in the front-rear direction is at the maximum in the first slide linking portions 36 located between adjacent first units 33. Also, the region where the inner wall 40B and the outer wall 41B overlap each other in the front-rear direction is at the maximum in the second linking portions 52 located between adjacent second units 51. In this way, in a state where the tolerances between the power storage devices 11 are at the minimum in the left-right direction, it is possible to account for the total sum of the tolerances.

FIG. 4 shows the wiring module 10 in a state where the tolerance between the electrode terminals 14 of the power storage devices 11 in the front-rear direction is at the maximum. The variable row-interval portions 57 have an oval shape and are somewhat bulged in the front-rear direction compared to the variable row-interval portions 57 shown in FIG. 2. In this way, a state in which the tolerance between the electrode terminals 14 of the power storage devices 11 is at the maximum in the front-rear direction can be accounted for.

Figure 5:
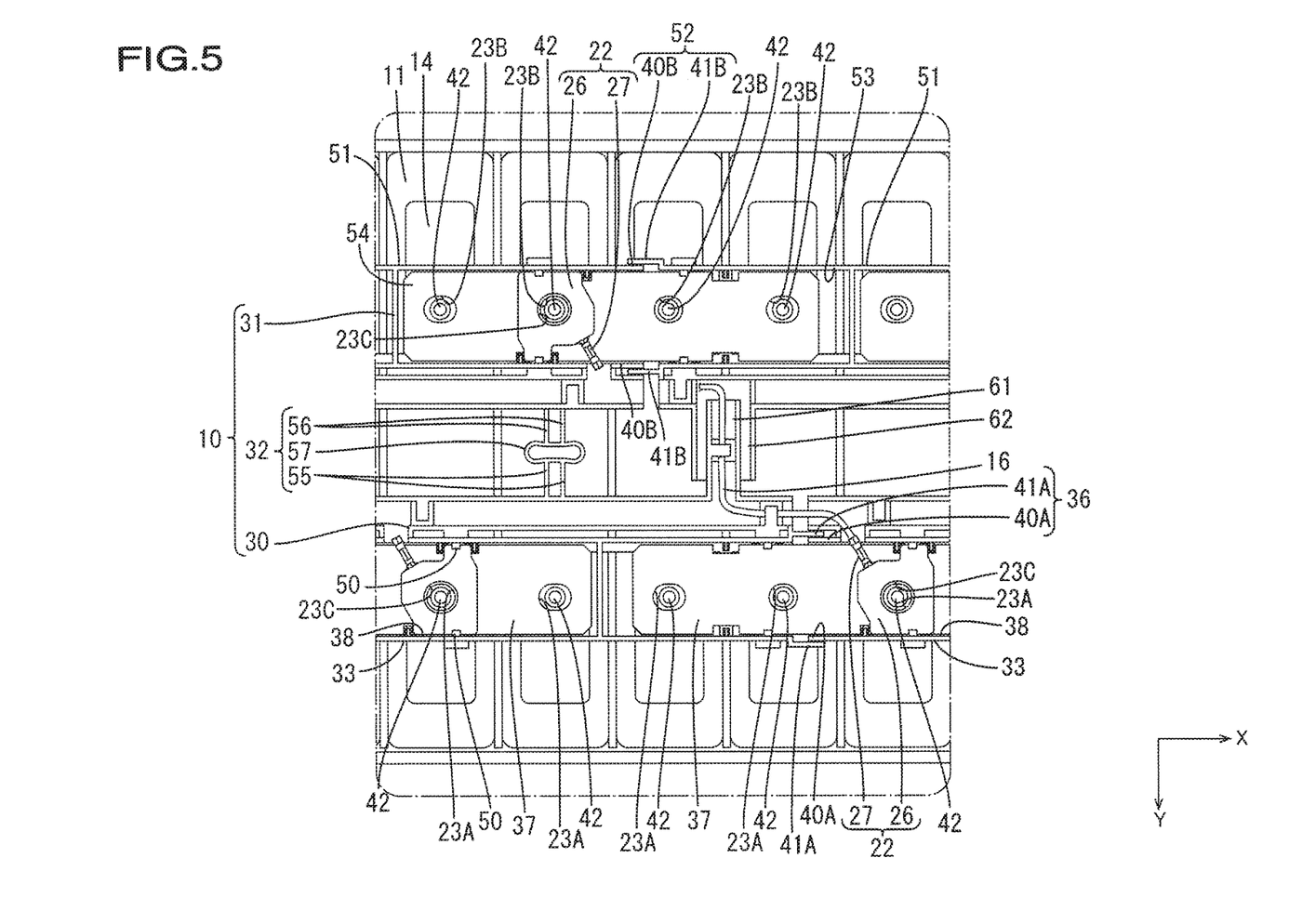
FIG. 5 shows a partially enlarged plan view of a case where tolerance between power storage devices is at the minimum in the front-rear direction.

FIG. 5 shows the wiring module 10 in a state where the tolerance between the electrodes 14 of the power storage devices 11 is at the minimum in the front-rear direction. The variable row-interval portions 57 have a shape more compressed in the front-rear direction than the variable row-interval portions 57 shown in FIG. 2. In this way, a situation where the tolerance between the electrode terminals 14 of the power storage devices 11 is at the minimum in the front-rear direction can be accounted for.

Also, according to the present embodiment, a first routing portion 28 provided in the first unit row 30 is provided with a first extension portion 61 that extends toward the second unit row 31, a second routing portion 29 provided in the second unit row 31 is provided with the second extension portion 62 that extends toward the first unit 30 and is arranged partially overlapped with the first extension portion 61, and a voltage detection wire 16 is disposed in the first routing portion 28, the first extension portion 61, the second routing portion 29, and the second extension portion 62.

With the above-described configuration, a voltage detection wire 16 can be routed spanning the first routing portion 28 and the second routing portion 29 via a first extension portion 61 and a second extension portion 62. Accordingly, freedom in the routing of voltage detection wires 16 is increased, and thus the voltage detection wires 16 can be easily routed in the wiring module 10.

FIG. 4 shows the wiring module 10 in a state where the tolerance between the electrode terminals 14 of the power storage devices 11 is at the maximum in the front-rear direction. In this state, the region where the first routing portion 28 and the second routing portion 29 overlap in the front-rear direction is at the minimum. In this way, even in a state where the tolerance between the electrode terminals 14 of the power storage devices 11 is at the maximum in the front-rear direction, the tolerance can be accounted for, thus allowing for routing of the voltage detection wires 16 spanning the first routing portion 28 and the second routing portion 29.

FIG. 5 shows the wiring module 10 in a state where the tolerance between the electrode terminals 14 of the power storage devices 11 is at the minimum in the front-rear direction. In this state, the region where the first routing portion 28 and the second routing portion 29 overlap in the front-rear direction is at the maximum. In this way, even in a state where the tolerance between the electrode terminals 14 of the power storage devices 11 in the front-rear direction is at the minimum, the tolerance can be accounted for, thus allowing for routing of the voltage detection wires 16 spanning the first routing portion 28 and the second routing portion 29.

OTHER EMBODIMENTS

The technology disclosed in the present specification is not limited to the embodiment described in the above description with reference to the drawings, and embodiments such as the following also fall within the technical scope of the technology disclosed in the present specification, for example.

(1) In the present embodiment, the wires are the voltage detection wires 16, but there is no limitation to this, and the wires may be wires for detecting the temperature of the power storage devices 11, and may also be wires for other devices.

(2) In the present embodiment, the first extension portions are located on the upper side overlapping the second extension portions on the lower side, but there is no limitation to this, and a configuration may be employed in which the first extension portions 61 are located on the lower side overlapped by the second extension portions 62 on the upper side.

(3) The power storage devices 11 may be a capacitor.

(4) The first linking portions are not limited to a shape integrated with a first unit 33, and may be a separate portion. Also, the second linking portions are also not limited to a shape integrated with a second unit 51, and may be a separate portion.

(5) In the above embodiment, the first bus bars 37 and the second bus bars 54 connect electrode terminals 14 of different polarities (series connection of power storage devices 11), but there is no limitation to this, and the bus bars may be for connecting electrode terminals 14 of the same polarity (parallel connection of power storage devices 11). For example, a configuration may be employed where other power storage devices 11 are connected in parallel to the wiring module of the above-described embodiment, and the first and second bus bars electrically connect electrode terminals 14 of the same polarity in this parallel connection.

(6) The number of power storage devices 11 can be freely selected.

LIST OF REFERENCE NUMERALS

- 10: Wiring module
- 11: Power storage device
- 12: Power storage device group
- 14: Electrode terminal
- 16: Voltage detection wire
- 28: First routing portion
- 29: Second routing portion
- 30: First unit row
- 31: Second unit row
- 32: Row linking portion
- 33: First unit
- 35: First warping linking portion
- 36: First slide linking portion
- 37: First bus bar
- 39: Warping portion
- 40A, 40B: Inner wall
- 41A, 41B: Outer wall
- 51: Second unit
- 52: Second linking portion
- 54: Second bus bar
- 57: Variable row-interval portion
- 61: First extension portion
- 62: Second extension portion

What is claimed is:

1. A wiring module configured to be provided on a power storage device group in which a plurality of power storage devices that each have an electrode terminal are arranged side-by-side in an alignment direction, the wiring module comprising:

a first unit row including a plurality of first units that each house at least one first bus bar configured to be connected to a corresponding electrode terminal, the plurality of first units being linked by a first linking portion having a first variable interval portion that enables adjustment of an interval between the plurality of first units;

a second unit row including a plurality of second units that each house at least one second bus bar configured to be connected to a corresponding electrode terminal, the plurality of second units being linked by a second linking portion having a second variable interval portion that enables adjustment of an interval between the plurality of second units, and the second unit row being disposed side-by-side with the first unit row; and a row linking portion that is connected to both the first unit row and the second unit row and links the first unit row and the second unit row, and includes a variable row-interval portion that enables adjustment of an interval between the first unit row and the second unit row.

2. The wiring module according to claim 1, wherein a first routing portion provided in the first unit row includes a first extension portion that extends toward the second unit row, a second routing portion provided in the second unit row includes a second extension portion that extends toward the first unit row and is arranged partially overlapped with the first extension portion, and a wire is disposed in the first routing portion, the first extension portion, the second routing portion, and the second extension portion.

* * * * *